Oct. 2, 1956 J. J. SLOMER 2,764,870
HYDRAULIC MOTOR CIRCUIT FOR CUT-OFF DEVICE OR THE LIKE
Filed Aug. 17, 1951 4 Sheets-Sheet 3
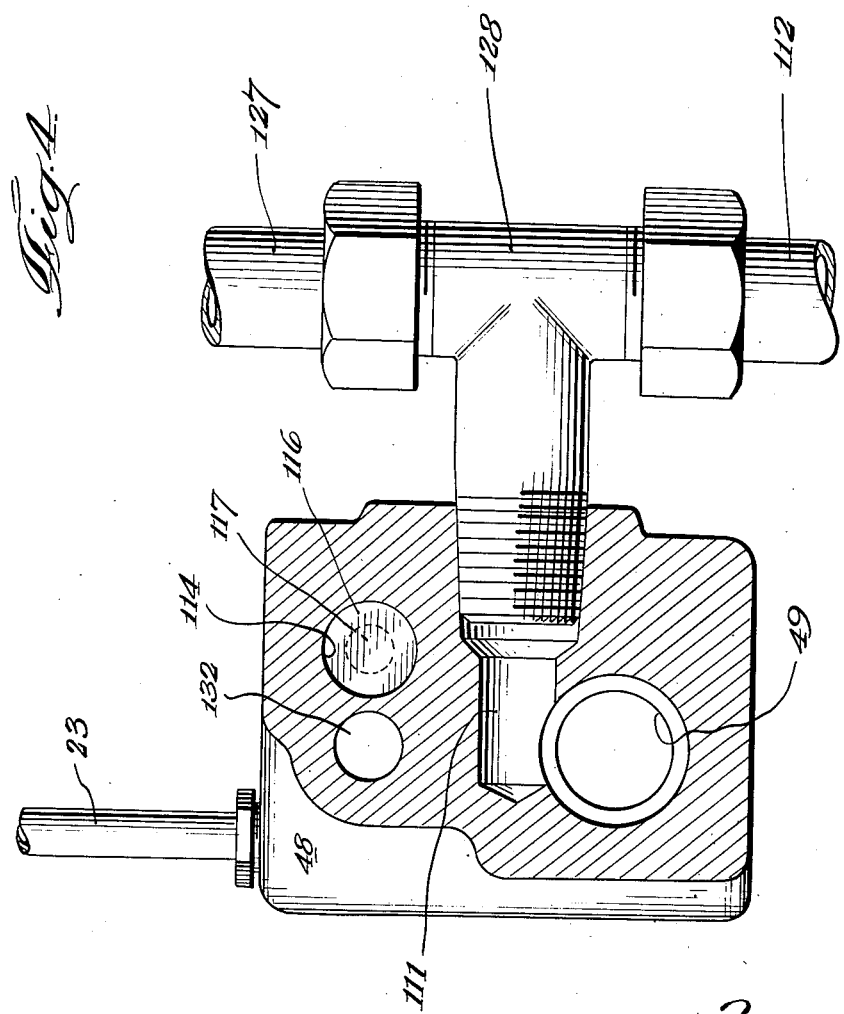
Inventor
Joseph J. Slomer
By Murray A. Gleeson
Attorney Oct. 2, 1956   J. J. SLOMER   2,764,870
HYDRAULIC MOTOR CIRCUIT FOR CUT-OFF DEVICE OR THE LIKE
Filed Aug. 17, 1951   4 Sheets-Sheet 4
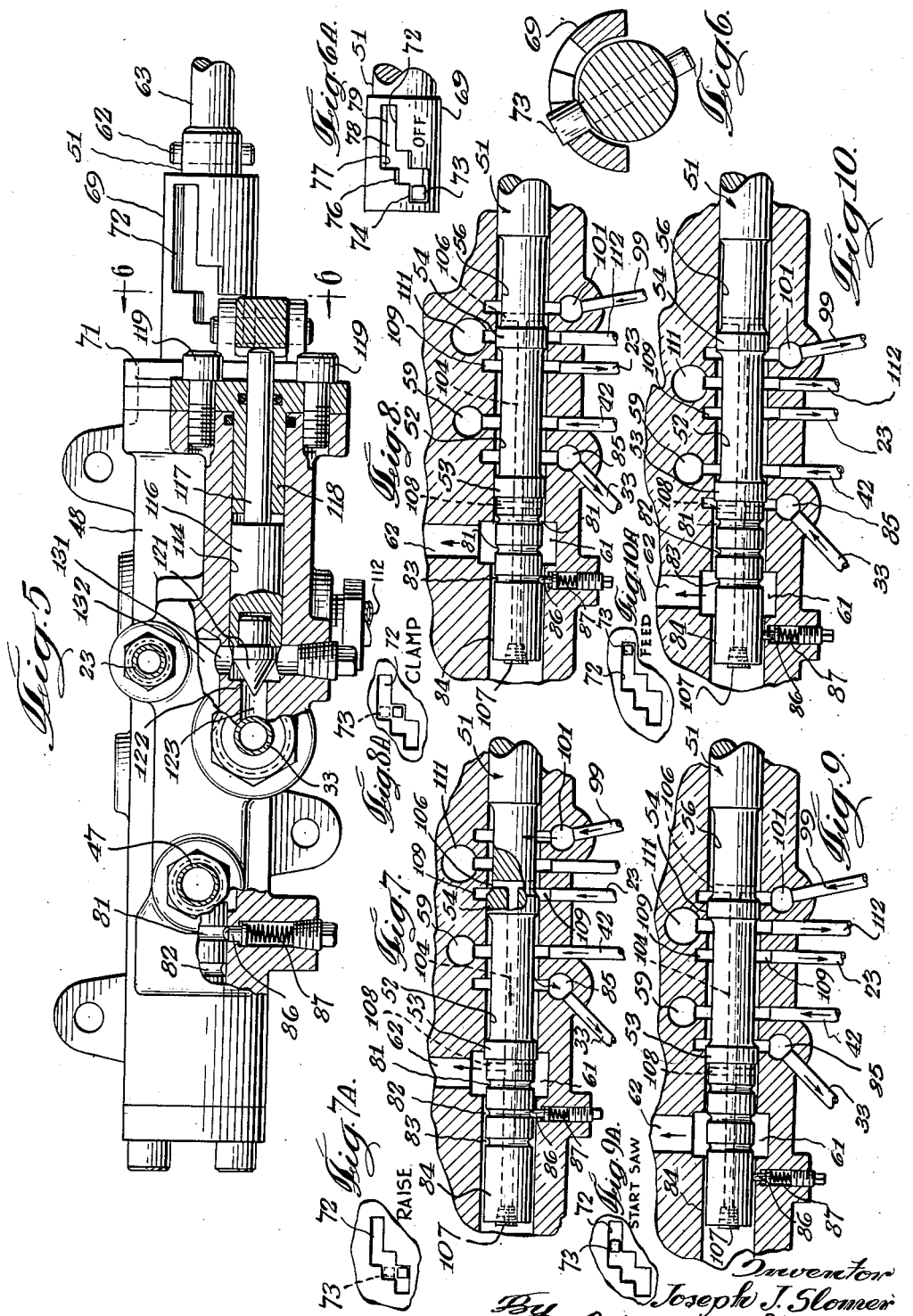
Inventor
Joseph J. Slomer
By Murray G. Gleeson
Attorney

United States Patent Office 2,764,870
Patented Oct. 2, 1956

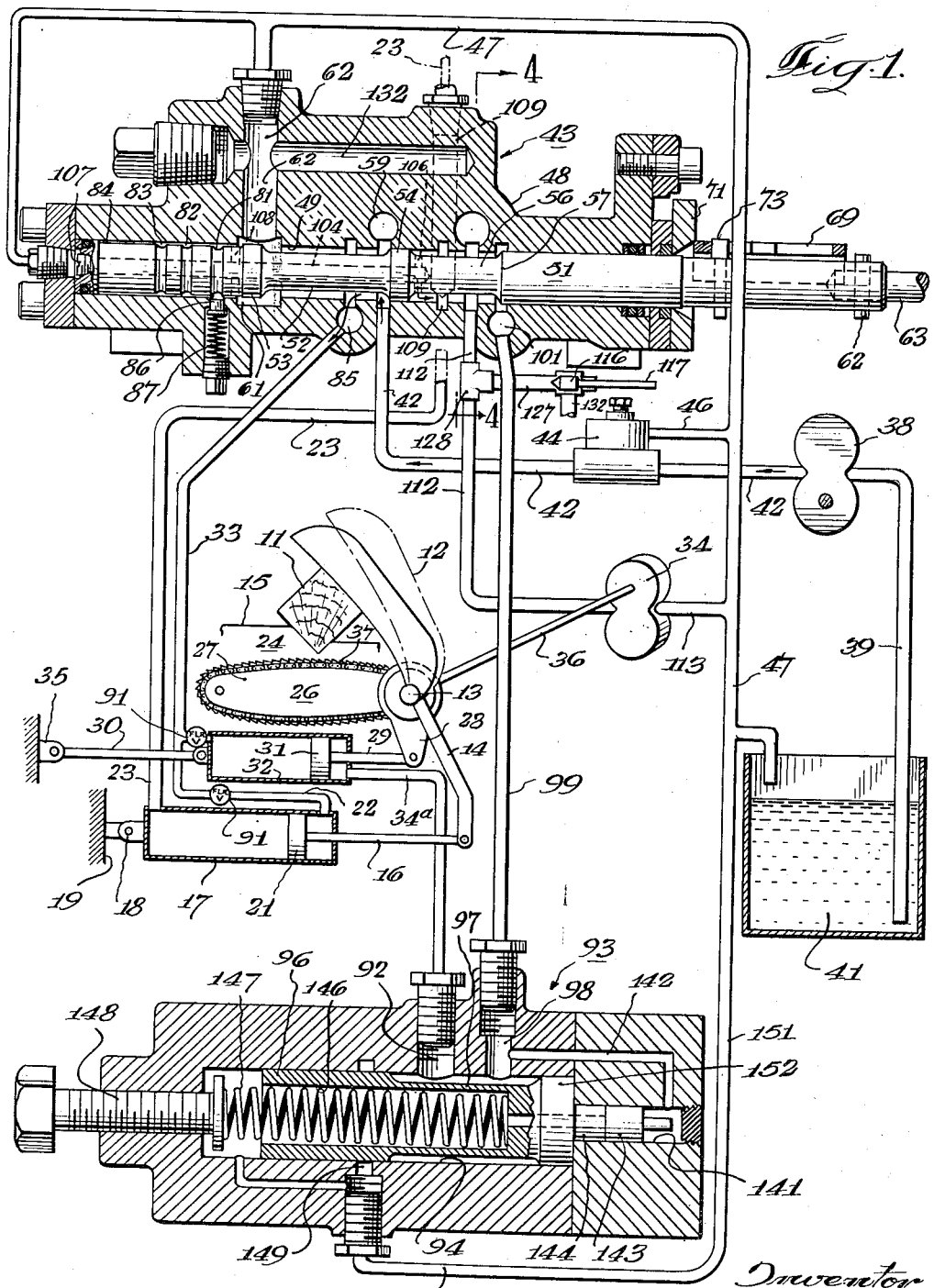

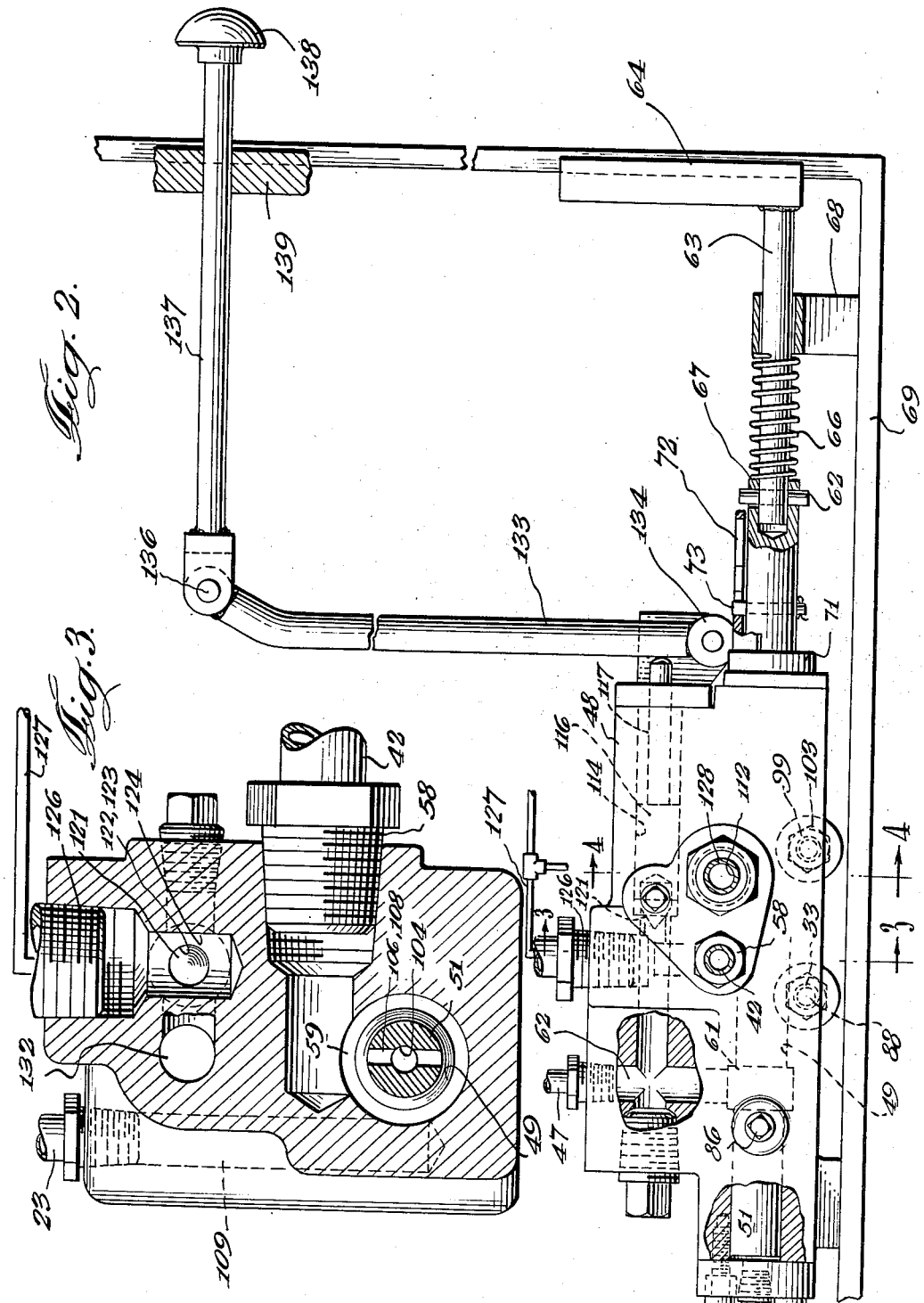

2,764,870

HYDRAULIC MOTOR CIRCUIT FOR CUT-OFF DEVICE OR THE LIKE

Joseph J. Slomer, Chicago, Ill., assignor to Goodman Manufacturing Company, Chicago, Ill., a corporation of Illinois Application August 17, 1951, Serial No. 242,394

3 Claims. (Cl. 60—97)

This invention relates generally to machines for sawing timbers and relates particularly to a machine for sawing mine timbers to proper size and to a machine of a type wherein protection is afforded to the operator at all times during the use thereof.

In the below surface mining of coal or other minerals conventional practice has required the use of timber supports spaced at proper intervals for supporting the mine roof. As the working face of the seam or vein advances by the removal of the minerals, the roof must be immediately supported by suitable props or timbers. The same practice is indicated as the entries are opened or continued through the mine. Heretofore, it has been the practice to cut the mine supports to size by hand, and to locate the supports in position by hand after cutting of the supports to proper size. Modern electric mining enables the use of power driven vehicles for supporting machinery for various functions, and a self powered vehicle for sawing mine timbers and locating same in position is disclosed in the patent of George W. Miller for Improvements in Timbering Machine, Patent No. 2,683,475, issued July 13, 1954. The invention described herein is directed to the mechanism for controlling the sequence of operations of a sawing machine having a saw guard for holding a mine timber in position for a sawing operation, and having a power driven saw and mechanism for providing feed movement of the saw against a mine timber while being cut thereby.

According to the present invention a fluid pressure system and control means therefor are provided for a sequence of operations which may be briefly stated as follows: one, maintaining a saw guard in position against a saw bench with the saw maintained in retracted position; two, the raising of the saw guard from a position guarding the motor driven saw, and concomitantly maintaining the saw in withdrawn position to permit the insertion of a mine support or timber in position on a saw bench so that it may be subsequently sawed by the moving saw; three, clamping the saw guard in position against the mine timber; four, supplying power to the motor for turning the saw; and five, providing feed movement for the motor driven saw so that the mine timber may be sawn while the guard is in place, thus preventing the possibility of injuring a workman operating the machine. According to the present invention a "deadman" control is also provided so that both hands of the operator must be used to initiate and continue the supply of motive fluid to the saw motor and the supply of pressure fluid providing feed movement of the saw. In practicing the invention herein use is made of a fluid pressure system which supplies pressure fluid for: one, operating the saw guard; two, driving a fluid motor to operate the saw; and three, providing feed movement of the saw through the work piece or timber. In a preferred embodiment of the invention, the operation of the saw guard, the saw and the mechanism for achieving feed movement of the saw is under the control of a valve so arranged that the position of the various elements of the mechanism may be made known to the operator by the position of a valve actuator associated with the valve. In such preferred form of the invention, a relief valve is provided and is so arranged as to respond to the increase in pressure beyond a desired value in the line supplying the saw motor (i. e. upon stalling of the saw motor), such increase in pressure being caused by resistance beyond a certain value encountered by the saw in cutting through a mine timber. The movement of the relief valve in response to such increase in pressure is effective to provide cessation and backing off of the feed movement of the saw to allow the saw motor to resume its proper operating speed, whereupon the pressure in the line supplying the saw motor will drop to a proper value, and the relief valve will be operated to cause resumption of the feed movement of the saw.

In a variant form of the invention, the operation of the saw motor and the feed movement thereof is under the combined control of a master control valve and a "deadman" valve, both of which must be operated by the two hands of the operator in certain operations of the sequence. The system is so constructed that when the operator is apprised of stalling of the saw motor, as by the change in the sound of operation, the operator need only release the deadman valve, which then bypasses pressure fluid directly from the pump to tank. The no load back pressure on the pump is then made effective to cause backing off of the saw motor, until it is once more brought up to speed, at which time the operator may again operate the deadman valve to provide full pressure fluid for operation of the saw motor and the saw feed.

In either form of the control system, a control valve is employed for controlling the operation of raising the saw guard, lowering same into position holding a work piece, starting the saw motor and starting the feed movement of the saw. Such control functions of the valve are achieved in steps made known to the operator by a detent locking a valve actuator in various positions and position indicating slots through which a control handle for the actuator must be moved in passing from one control position of the valve to another. The control valve is also constructed with a deadman valve actuator so that pressure fluid is ported directly from the pump to tank so that the saw motor and saw feed are operated only when both the control valve and the deadman valve are operated.

In one form of the invention, the mechanism is so arranged that if the feed movement of the saw through the work piece is at such a rate as to cause binding of the saw and consequent stalling of the fluid motor operating same, the feed movement of the saw will be automatically discontinued, and the saw backed away from the work so that the saw motor can be brought back to proper speed. As an adjunct to the mechanism the deadman control must be operated so that it is impossible for the operator to injure himself by the moving saw blade, should the operator, for any reason, attempt to make adjustments while the mechanism is in operation, there being required of the operator the use of both of his hands for the initiation and completion of the sawing part of the entire sequence of operations.

With the foregoing considerations in mind, it is a principal object of the invention to afford a completely automatic control mechanism for controlling the sawing mechanism of a timber setting machine used in underground mining.

Another object of the invention is to provide a completely hydraulic system for carrying on the steps of placing a mine timber in position on a sawing machine, clamping same in place, and sawing the timber at a desired point thereon.

Yet another object of the invention is to provide a valve for controlling the sequence of operations of a sawing machine consisting of a saw guard, a saw motor and a saw feed, said valve being so constructed as to apprise the operator of the particular operation then obtaining in the sawing machine.

Other and important objects of the invention will be apparent from the study of the specification following taken with the drawings which together show a preferred embodiment of the invention and what is now considered to be the best mode of applying the principles thereof. Other embodiments of the invention will be suggested to those having the benefits of the teaching of the specification herein, and it is contemplated that the invention may take other forms as may be embraced within the purview and scope of claims following this specification.

In the drawings:

Figure 1 is a general schematic view of a sawing machine according to the present invention, the control mechanism therefor being shown in a vertical longitudinal cross section;

Fig. 2 is a side elevation view of the control valve shown in Fig. 1, also showing the actuators for the deadman control and the handle for shifting the control valve to the several positions thereof;

Fig. 3 is a section taken along the line 3—3 of Fig. 2 looking in the direction of the arrows and showing the disposition of various fluid passageways within the control valve;

Fig. 4 is a section taken along the line 4—4 of Figs. 1 and 2 showing the disposition of other fluid passageways within the control valve;

Fig. 5 is a plan view of the control valve shown in Figs. 1 and 2, showing details of the control valve actuator, the deadman control being shown in horizontal section and other parts of the control valve being shown in plan view;

Fig. 6 is a section taken substantially along the line of 6—6 of Fig. 5 looking in the direction of the arrows, showing details of the positioning and locking mechanism for the actuator of the control valve of Figs. 1, 2 and 5;

Fig. 6A is a plan view of the control valve locking mechanism, showing the position of a locking member when the control valve is in the released or off position;

Fig. 7 is a partial vertical longitudinal sectional view through the control valve shown in Fig. 1, the valve plunger being shown in elevation, the control valve being in position for raising the saw guard for the placing of a mine timber upon the saw bench;

Fig. 7A is a partial plan view of the position indicating and locking mechanism for the actuator for the control valve of Fig. 1 in the position corresponding to Fig. 7;

Fig. 8 is a partial vertical longitudinal sectional view similar to Fig. 7, the valve plunger being shown in elevation and being in position where the saw guard is moved to a position for holding the mine timber in position on the saw bench;

Fig. 8A is a partial plan view showing the position of the locking mechanism for the actuator valve when the control valve is in the position of Fig. 8;

Fig. 9 is a view similar to Figs. 7 and 8 showing the control valve plunger in position for supplying pressure fluid to the saw motor;

Fig. 9A is a view similar to Figs. 7A and 8A showing the position of the locking mechanism when the valve is in the position shown in Fig. 9;

Fig. 10 is a view similar to Figs. 7 to 9 inclusive showing the position of the control valve plunger for feed movement of the saw; and Fig. 10A is a view similar to Figs. 7A, 8A and 9A showing the position of the locking mechanism when the control valve plunger is in the position as shown in Fig. 10.

Referring now particularly to Fig. 1 of the drawings the present invention is described in connection with a saw bench 15 for a mine timber 11 adapted to be held in position by a saw guard 12. The location of the saw bench 15 with respect to a mine vehicle for loading, cutting and installing mine timbers may be that as more specifically disclosed in Letters Patent issued to George W. Miller for Improvements in Timbering Machine, Patent No. 2,683,475, issued July 13, 1954. The saw guard 12 is mounted to pivot about a shaft 13 and is rocked to and from clamping position by a first fluid operated motor consisting of a rock arm 14 pivotally connected to a piston rod 16 of a double acting hydraulic cylinder 17 pivoted at 18 to any convenient abutment 19 of the aforesaid mine vehicle. The piston rod 16 has a piston 21 mounted thereon within the cylinder 17, and fluid is directed against either side of the piston 21 by conduits 22 and 23 connected respectively to opposite ends of the cylinder 17 for moving the piston 21 under conditions as will appear as this specification proceeds.

The mine timber 11 is disposed over a slot 24 formed in the saw bench 15, as may be more clearly shown in the aforesaid application, and a chain type saw 26 is adapted to move about the shaft 13 in the slot 24 in a clockwise direction against the mine timber 11 to saw the same. The exact form of the chain saw 26 forms no part of the present invention and it is contemplated also that the saw 26 may be of the circular type, such a modification being within the scope of the present invention. The chain saw 26 includes a frame 27 co-acting with a rock arm 28 adapted to turn on the shaft 13. The rock arm 28 is part of a fluid motor referred to in the claims as a "third" fluid motor, and is hingedly connected to a piston rod 29 having a piston 31 thereon movable in a double acting hydraulic cylinder 32 pivoted to a link 30 which in turn is pivoted to an abutment 35. Fluid is admitted to the cylinder 32 under conditions as will appear as this specification proceeds, by a fluid conduit 33 and a fluid conduit 34a connected respectively to opposite ends of the cylinder 32. The saw 26 is driven by a fluid driven motor 34, referred to in the claims as a "second fluid operated motor," and connected by a shaft 36, which through a gear train, not shown, drives cutter teeth 37 of the chain saw 26.

Fluid under pressure is provided for the system shown in Fig. 1 to drive the saw motor 34 and actuate the cylinders 17 and 32 and their respectively operated saw guard 12 and chain saw 26, and includes a pump 38 connected by an intake line 39 to a reservoir 41 of hydraulic fluid. The output from the pump 38 is connected to a pressure line 42 to a control valve indicated generally by the reference numeral 43, which controls the flow of fluid to the hydraulic cylinders 17 and 32 and the saw motor 34. A pressure relief valve 44 of any suitable construction is connected in the pressure line 42 and fluid at excess pressure is bled by the valve 44 to a return line 46 connected to a return line 47 to the fluid reservoir 41.

The control valve 43 includes a valve body 48 having a cylindrical bore 49 therein. A valve plunger 51 is slidable within the bore 49 and has a spool portion 52 of reduced diameter, the lengthwise dimension of which is defined by spaced lands 53 and 54. The plunger 51 also has a spool portion 56 of reduced diameter contiguous to the spool 52, the lengthwise dimension of which is defined by the land 54 and a land 57. As seen in Figs. 1 and 3, the pressure line 42 is connected by a pressure fitting 58 to a pressure port 59. In the position of the valve 43 shown in Fig. 1, pressure fluid moves from the pressure port 59 past the reduced diameter spool portion 52 to an annular exhaust port 61, and a passageway 62 in the valve body 43 connected by the return line 47 to the reservoir 41.

The valve plunger 51 has a pinned connection at 62 to a valve push rod 63 having an actuating handle 64 extending laterally therefrom. The stem 63 and the plunger 51 are adapted to be moved to the right as seen in Figs. 1 and 2 by the handle 64 for the several positions of the valve plunger 51, such movement being opposed by a return spring 66 encircling the push rod 63 and abutting at one end thereof the exposed end 67 of the valve plunger 51, and at the other end a push rod guide 68 mounted on a frame member 69 of the vehicle.

The valve plunger 51 is adapted to be moved by the actuating handle 64 and locked in a number of sequential positions according to the operation then taking place in the system of Fig. 1. As seen in Figs. 1, 2, 5, 6 and 6A, a substantially semi-cylindrical ferrule 69 formed with an annular flange 71 is secured to the valve body 48. The plunger 51 extends through the flange 71, and the semi-cylindrical ferrule 69 overlies the plunger 51. As seen in Figs. 5, 6 and 6A, the ferrule 69 is formed with a locking and indexing slot 72 cooperating with a locking pin 73 extending laterally from the exposed end of the plunger 51. The locking pin 73 thus locks with a portion 74 of the indexing slot 72, and is movable by a combination translative and rotative movement of the plunger 51 to a portion 76 of the slot 72, and thence similarly to a portion 77. The plunger 51 is movable also to positions marked 78 and 79 by a translative movement only of the plunger 51. The positions of the plunger 51 as marked by the reference numerals 74, 76, 77, 78 and 79 conform respectively to the "off" position of the system shown in Fig. 1, the position where the saw guard 12 is raised for placing of a timber 11 on the saw bench 15, conforming to the position shown in Fig. 7, the position where the saw guard 12 is lowered to hold the timber 11 in position on the saw bench, conforming to the position shown in Fig. 8, the position where the saw motor 34 is started conforming to the position shown in Fig. 9, and lastly where the feed movement of the saw 26 by the fluid motor 32 is started and completed conforming to the position shown in Fig. 10.

The inner end of the valve plunger 51 is provided with annular detent slots 81 to 83 which are engaged by a pin detent 86 biased by a spring 87. The annular detent slots 81 to 83 may be employed in conjunction with the locking and indexing slot 72 and the several positions 74, 76, 77, 78 and 79 thereof, or may be employed to the exclusion of the ferrule 69 and the locking and indexing slot 72 thereof. The engagement of the detent 86 with the respective detent slots correspond to the several operating conditions of the control valve 43 in the system of Fig. 1. Thus the engagement of detent slot 81 with detent 86 corresponds to "off" position of the system with the saw guard 12 lowered against the bench 15, detent slot 82 to the position where the saw guard 12 is raised for placing of the timber 11 on the saw bench 15, detent slot 83 to the position where the saw guard 12 is lowered to hold the timber 11 in place on the bench 15. For positions corresponding to positions 78 and 79 of the locking pin 73 in the locking slot 72, the detent 86 rides on a cylindrical surface 84 of the valve plunger, which surface 84 corresponds, as will be understood, to the positions where the saw motor 34 is started, and lastly where the feed movement of the saw 26 is started and completed through the mine timber 11. It may be noted that the diameter of the plunger 51 adjacent the detent slots 81, 82 and 83 together with the diameter of the plunger at 84 is such as to afford a somewhat loose fit, the land 53 only at such part of the plunger 51 closely fitting the bore 49.

The sequential movement of the valve plunger 51 for the raising of the saw guard 12 and the lowering of same against the mine timber 11 will now be considered. In the position shown in Fig. 1, the system may be considered in the "off" position with the saw guard 12 in position against the saw bench 15. In such position of the control valve 43 the saw 26 is retracted within the slot 24. In the position of the valve 43 as seen in Fig. 1, pressure fluid enters the port 59 and moves at no load back pressure of the pump 38 past the spool 52 and out the tank port 61 and passageway 62 to the return line 47. The same no load back pressure is maintained at a saw guard port 85, see also Fig. 2, there being a fitting 88 for the fluid conduit 33 connected to cylinder 32 and the conduit 22 branching therefrom to the cylinder 17, flow regulator valves, indicated generally by the reference numeral 91, proportioning the flow of fluid to said cylinders.

The piston rod end of the cylinder 32 is connected by the line 34a to a port 92 of a saw motor relief valve indicated generally by the reference numeral 93. A bore 94 is provided in the saw motor relief valve 93, and a valve plunger 96 is movable therein and has a spool portion 97 of reduced diameter. When the valve 93 is in the position as seen in Fig. 1, the port 92 is connected to a port 98, and a fluid conduit 99 is connected to a saw feed port 101. As seen in Fig. 2, the pressure line 99 is connected to the valve body 48 on the reverse side thereof as seen in Fig. 2 at a pressure fitting 103.

The valve plunger 51 has an axial bore 104 therein which terminates in a cross bore 106 intersecting the spool portion 56 of the valve plunger 51. The bore 104 is closed at the left hand end of the plunger 51 by a pipe plug 107, and is additionally cross bored as at 108 between the left end of the valve plunger 51 and the land 53 adjacent the relieved diameter portion 84 thereof.

The conduit 23 is connected to one end of the cylinder 17 and is connected to a port 109, which in the position shown in Fig. 1 is connected to the tank port 61 by the cross drilled passageways 106 and 108 and the longitudinally drilled passageways 104 in the valve plunger 51.

Under the conditions thus far described there will be a differential pressure across the piston 21, the amount of such differential pressure being determined by the diameter of the piston rod 16, such differential pressure causing the saw guard 12 to be maintained in position against the saw bench 15. It will be apparent also that since both sides of the piston 31 of the fluid cylinder piston 32 are maintained against the no load back pressure of the pump 38, there will be a differential pressure against the piston 31 thereof causing the saw 26 to rock in a counter-clockwise direction about the pivot 13 to retract same into the slot 24.

Referring now to Figs. 7 and 7A of the drawings, when the plunger 51 is moved both rotatably and translatively so that the locking member 73 occupies the dotted line position as seen in 7A in the slot 72, the saw guard 12 is moved to the raised position as seen in Fig. 1, so that a mine timber may be placed in position on the saw bench 15. Under such condition the land 53 will lap the tank port 61, and the land 54 will lap the saw guard port 109. Under such condition pressure fluid from the pump 38 will move by way of the pressure line 42 past the spool 52 and past the port 85 into the fluid line 33 supplying the fluid motors 17 and 32. The full pressure from the pump 38 is thus made available against the side of the piston 31 remote from the piston rod 29, while the piston rod side of the piston 31 is connected to tank by way of the lines 34a and 99, port 101, passageways 106, 104 and 108 to the tank port 61, thereby maintaining the amount of such differential pressure across the piston 31 at a greater value than before.

The pressure in the line 33 is at the same time made available against the piston rod side of the piston 21, the opposite side of the piston 21 being connected to tank by the line 23 and the port 109, the fluid circuit being completed to the tank port 61 through the valve plunger 51 by the passageways 106, 104 and 108. The differential pressure across the piston 21 thus causes the piston 21 to move to the left as seen in Fig. 1 to raise the saw guard 12 for insertion of a mine timber 11 on the saw bench 15.

After the mine timber 11 is placed in position on the saw bench 15 the guard 12 is moved in place against the timber to clamp same by movement of the valve plunger 51 to the position as seen in Figs. 8 and 8A. The valve plunger 51 is moved by a combination translative and rotative operation so that the locking finger 73 is in the dotted line position as seen in Fig. 8A. In such position of the valve plunger 51 the land 54 laps a saw motor port 111 connected by a pressure line 112 to the saw motor 34, the spent fluid from the saw motor 34 being discharged by a line 113 to the tank line 47 and thence to the tank 41.

In the position of the valves as seen in Figs. 8 and 8A a differential pressure will continue to be maintained across the piston 21, both sides of the piston, in the position of the plunger 51 as shown in Fig. 8, being maintained at the full output pressure of the pump 38, since the land 53 continues to lap the tank port 61.

The saw 26 in such position of the valve plunger 51 as seen in Figs. 8 and 8A will also continue to be maintained in the retracted position, since the full pressure from the pump 38 will be maintained against the top of the piston 31, while the piston rod side of the piston 31 will be maintained at the no load back pressure of the pump 38 since the conduits 34a and 99 are connected at the port 101 and through the passages 106, 104 and 108 to the tank port 61.

A "deadman" control is provided for the system shown in Fig. 1 so that the operation of the saw motor and the feed movement thereof can be accomplished only when the operator has both of his hands simultaneously engaging the control valve 43 and the deadman control which will now be described. As seen with particular reference to Figs. 3, 4 and 5, the valve body 48 has a bore 114 therein for a valve plunger 116 having a valve stem 117 guided within a valve guide 118 held to the valve body 48 by cap screws 119. The valve plunger 116 has a conical face 121 adapted to cooperate with a valve seat 122 formed in a passageway 123 within the valve body 48 and intersecting a passageway 124, see Fig. 3, there being a pressure fitting 126 connecting a conduit 127 to a T fitting 128 at the saw motor port 111 and line 112, the other arm of the T being connected to the line 112 to the saw motor 34.

As seen in Fig. 2, the valve stem 117 and the valve plunger 116 are moved to the left as seen in Fig. 5 to close the passageway 122 from communication with a passageway 131 intersecting a passageway 132 which in turn is connected to the tank passageway 62, see also Fig. 1.

A valve actuator for the "deadman" valve 116 consists of an arm 133 which is pivoted at 134 to the valve body 48 and which in turn is hingedly connected at 136 to a push rod 137 having a push button 138 mounted on an end thereof extending from the mine vehicle, the push rod 137 being guided in a frame member 139 thereof.

Referring now to Figs. 9 and 9A of the drawings, the valve plunger 51 is shown as being in position where the saw motor 34 is started. Concomitant with the movement of the valve plunger 51 to the position as seen in Figs. 9 and 9A the "deadman" control valve 116 must be moved to the position with the face 121 thereof on the seat 122 to prevent the pressure at the port 59 from being relieved to the tank by the passageways 131, 132. With the valve 116 closed and the plunger 51 maintained in the position shown in Fig. 9, pressure is available at the port 111 and the line 112 to drive the saw motor 34 and the saw 27. At the same time pressure is available at the port 109 and in the line 23 and also at the port 85 and in the line 33 to maintain a differential pressure across the piston 21 in the manner as hereinabove described to maintain the saw guard 12 in position clamping the mine timber 11 in place on the saw bench 15. The pressure in the line 33 is also available against the top of the piston 31, the piston rod side of the piston 31 being connected to tank by the lines 34a and 99, the return to tank being completed by the passageways 106, 104 and 108 within the valve plunger 51, the differential pressure just described continuing to maintain the saw 27 in the retracted position as seen in Fig. 1.

The operation of the valve plunger 51 from the position of Fig. 8 to the position as seen in Fig. 9 is generally also accompanied by rapid sequential movement to the position of the valve plunger 51 as seen in Figs. 10 and 10A. In effecting such movement from the position seen in Fig. 8, the locking member 73 is moved from the dotted line position as seen in Fig. 8A, in the slot 72 through the position as seen in Fig. 9A and then to the position as seen in Fig. 10A. The position as seen in Fig. 10 of the valve plunger 51 is such as to make full pressure fluid available against the piston rod side of the piston 31, the fluid conduit 33 and the pressure port 85 being connected to tank by flow of the fluid around the portion 84 of the valve plunger 51 to the left of the land 53 thereof. As seen in Fig. 10 the land 54 of the valve plunger 51 uncovers the port 101 causing the pressure fluid available at the pressure port 59 to flow past the spool 52 to the line 99, the pressure fluid being supplied past port 98 and spool 97 of the saw motor relief valve 93 to the port 92 and thence to the line 34 against the piston rod side of the piston 31.

At the same time pressure fluid is available in the line 23 and past the spool 52 against the top of the piston 21 to maintain the saw guard 12 in position of the mine timber 11, the piston rod side of the piston 21 being connected by the line 22 and 33 to tank at port 85. At the same time pressure at the port 59 is made available at the saw motor port 111 and the line 112 to the saw motor 34, to drive the saw 26 while feed movement thereof is being provided by the pressure against the piston rod side of the piston 31.

The foregoing operation of the valve 43 to effect the feed movement of the saw concurrently with the operation of the saw is, of course, effected only when the "deadman" valve 116 is maintained in the closed position on the seat 122. It will thus be apparent that the last two steps of operation of the control valve 43 must be concomitent with the operation of the "deadman" valve 116, thereby requiring the use of both hands of the operator so that there is no possibility of injury by the moving saw. It is of course obvious that if the "deadman" valve 116 is released, the pressure against the conical face 121 will move the valve 116 to the right as seen in Fig. 5 and pass the pressure fluid to tank by way of the passageway 132. Under such condition both sides of the piston 31 will be maintained at the no load back pressure of the pump 38, since the line 99 and the port 101 will be at such no load back pressure, and since the line 33 and the port 85 are already at such no load back pressure, the differential of such no load back pressure across the piston 31 will cause the piston 31 to be operated to the right thereby providing retractile movement of the saw 26 about the shaft 13. The same condition will also prevail with respect to the piston 21, both sides of the piston being under such condition exposed to the no load back pressure of the pump 38, and the differential of pressure on the piston 21 continuing to maintain the saw guard 12 in position against the mine timber 12. Likewise, such release of the "deadman" valve 116 relieves the pressure fluid for operating the saw motor 34 thereby stopping the same when the retractile movement of the saw 26 takes place under the conditions just described.

It will be obvious also that if the actuating handle 64 is released, the force of the return spring 66 will move the plunger 51 to the position as seen in Fig. 8, the locking finger 73 under such condition being in the dotted line position as seen in Fig. 8A. Irrespective of the condition of the "deadman" valve 116 the differential pressures described across the pistons 31 and 21 will be such as to maintain the saw guard 12 in position against the mine timber 11 while at the same time the saw 26 is retracted. Under such conditions the land 54 will lap the port 111 thus cutting off the supply of motor fluid to the motor 34, which condition is irrespective of whether the valve 116 is upon the seat 122.

The sequential operation of the saw motor 34 and the feed movement of the saw 27 takes place upon movement of the valve plunger 51 to the positions as seen in Figs.

9 to 10A inclusive. The feed movement of the saw 26 by the movement of the piston 31 may be such as to bind the saw 26 and cause stalling of the saw motor 34. Such a contingency may, of course, be discernible to the operator by the change in the sound of the saw, and ordinarily the saw may be retracted by moving the valve plunger 51 to the position as seen in Fig. 9, which movement of the valve plunger 51 provides for retractile movement of the saw until the saw is once more brought up to speed, or by release of the "deadman" control which would give both retractible movement to the saw and permit the saw motor 34 to operate under the no load back pressure of the pump 38.

It is preferred, however, that the feed movement of the saw be discontinued, and the saw retracted so that the saw motor can be brought up to proper operating speed before subsequent feed movement of the saw against the timber 12. To this end the saw motor relief valve 93 is so arranged as to respond automatically to increase in pressure thereon as may be occasioned by increase in fluid pressure beyond a desired amount against the saw motor 34. To this end the excess in operating pressure in the line 112 supplying the saw motor 34 will be reflected into the port 101 and lines 99, port 98, the passageway around the spool 97 of the valve member 96, the port 92 and the line 34a to the piston rod side of the piston 31. The passageway 98 communicates with a pilot bore 141 by a passageway 142. The pilot bore 141 is provided with a pilot piston 143 which bears against an extension 144 of the valve plunger 96. As seen in Fig. 1 the plunger 96 is bored at 146 to receive a valve spring 147 which is adjusted in its load by an adjusting screw 148. The plunger 96 is normally biased to the right by the spring 147 to the position as seen in Fig. 1, but when the pressure in the line 99 exceeds a predetermined value the pilot piston 143 moves the valve plunger 96 to the left to unlap a port 149 connected by a line 151 to the reservoir 41. Under such condition the pressure against the piston rod side of the piston 31 is relieved to the reservoir 41, and since the top of the piston 31 is maintained at the no load back pressure against the pump 38, the differential pressure across the piston 31 will cause retractile movement of the saw 26. As seen in Fig. 1, the valve plunger 96 has a land 152 which blocks the port 98 so that pressure may be supplied to the saw motor 34 to bring the same up to speed once more, while the saw 26 is maintained in the retracted position until the saw motor 34 is once more brought up to such proper speed, at which time the diminution of pressure against the pilot piston 143 will cause the spring 139 to move the plunger 96 once more to the position as seen in Fig. 1, full pressure fluid once more being made available against the piston rod side of the piston 31 to effect feed movement once more to the saw 26.

From the foregoing description it will be apparent that when the sawing operation has been completed, the valve plunger 51 may be relased to the position as seen in Fig. 8A, and then given a combination translative and rotative movement until the valve is in the position as seen in Fig. 7, the locking finger 73 being in the dotted line position as seen in Fig. 7A. At this time the saw will have been retracted and the saw guard raised for removal of a sawn timber. Obviously, the plunger 51 may be returned to the position as seen in Fig. 1 with the saw guard down or may be returned to the position as seen in Fig. 8 with another timber in position for a subsequent sawing operation.

It is believed that the sequence of operations obtaining in the system upon return movement of the control valve 51 will be apparent to those skilled in the art, and it is therefore believed that further description is not necessary as respects the functions taking place upon such return movement of the valve 43.

From the description foregoing it will be apparent that there has been provided a novel and useful system and a control valve for such system for operating a sawing machine. It will also be apparent from the description above that the entire system is completely foolproof and it is impossible to endanger the workman in charge of operating the machine. While the invention has been described in terms of embodiments that it may assume in practice it is not intended that the invention be limited by the precise embodiments shown herein, other embodiments being capable of suggestion to those skilled in the art, and it is therefore intended that the scope of the invention be limited only by the terms of the claims here appended.

I claim:

1. In a hydraulic control system including a pump for supplying fluid under pressure, a first fluid operated motor, a second fluid operated motor operable after said first motor, a third fluid operated motor arranged to advance or retract said second motor, a control valve connected in circuit with said pump and said motors for controlling in desired sequence the operation of said motors, said control valve having a valve member shiftable therein for maintaining differential pressures against said motors to operate said motors in desired sequence, and means connected in circuit with said control valve and operable in response to the increase in pressure against said second motor occasioned by the stalling thereof for operating said third motor in a retractile direction for a sufficient time to enable said second motor to resume operating speed before being further advanced by said third motor.

2. In a hydraulic control system including a pump for supplying fluid under pressure, a first fluid operated motor, a second fluid operated motor operable after said first motor, a third fluid operated motor arranged to advance or retract said second motor, a control valve connected in circuit with said pump and said motors for controlling in desired sequence the operation of said motors, said control valve having a valve member shiftable therein for maintaining differential pressures against said motors to operate said motors in desired sequence, and valve means connected in circuit with said control valve including a valve member movable in said valve means in response to the increase in pressure against said second motor occasioned by the stalling thereof for controlling the application of pressure to said third motor whereby said third motor is retracted for a sufficient time to enable said second motor the resume operating speed before being further advanced by said third motor.

3. In a hydraulic control system including a pump for supplying fluid under pressure, a first fluid operated motor, a second fluid operated motor operable after said first motor, a third fluid operated motor arranged to advance or retract said second motor, a control valve connected in circuit with said pump and said motors for controlling in desired sequence the operation of said motors, said control valve having a valve member shiftable therein for maintaining differential pressures against said motors to operate said motors in desired sequence, and valve means connected in circuit with said control valve including a valve member movable in said valve means in response to the increase in pressure against said second motor occasioned by the stalling thereof for controlling the application of pressure to said third motor whereby said third motor is retracted for a sufficient time to enable said second motor the resume operating speed before being advanced again by a resumption of said first differential pressure across said third motor.

References Cited in the file of this patent
UNITED STATES PATENTS

| | | |
|---|---|---|
| 2,301,028 | Esch | Nov. 3, 1942 |
| 2,368,138 | Hayden | Jan. 30, 1945 |
| 2,511,563 | Bullard | June 13, 1950 |
| 2,598,233 | Deardorff | May 27, 1952 |